United States Patent Office 3,846,284
Patented Nov. 5, 1974

3,846,284
HYDROCONVERSION PROCESS
Joseph Jaffe, Berkeley, Calif., assignor to Chevron Research Company, San Francisco, Calif.
No Drawing. Filed Dec. 1, 1972, Ser. No. 311,083
Int. Cl. C10g 23/02
U.S. Cl. 208—216       5 Claims

ABSTRACT OF THE DISCLOSURE

An improved stability (lower catalyst fouling rate) is achieved for a hydrodesulfurization process using a catalyst prepared by coprecipitation from a solution containing aluminum hydroxy-chloride and soluble compounds of Group VI and Group VIII metals.

BACKGROUND OF THE INVENTION

Field of the Invention

The present invention relates to a hydrodesulfurization process using a catalyst containing Group VI and Group VIII metals and prepared in part from aluminum hydroxy-chloride.

It has become well known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitably low sulfur content is entirely inadequate to meet present day requirements and it becomes increasingly important to develop improved desulfurization techniques to treat the more accessible and abundant residual fuel oils of relatively high sulfur content. Desulfurization technology is presently concerned with the development of improved desulfurization catalysts; for example, hydrodesulfurization catalysts which have a lower fouling rate and thus can be used for longer on-stream operating cycles, hence reducing the downtime and catalyst cost for hydrodesulfurization.

Hydrodesulfurization is generally effected at reaction conditions including an imposed hydrogen pressure within the broad ranges of about 100 to about 5,000 pounds per square inch (p.s.i.). Normally, the hydrogen is charged together with recycle hydrogen to provide from about 100 to about 10,000 standard cubic feet per barrel (s.c.f./bbl.) of hydrocarbon charge. Hydrodesulfurization reaction conditions further include an elevated temperature, usually from about 200° F. to about 850° F. although temperatures in the higher range, say from about 600° F. to about 850° F., are most suitable. Also, the sulfur-containing feedstock is generally suitably processed at a liquid hourly space velocity (LHSV) of from about 0.1 to about 10. Hydrodesulfurization catalysts generally comprise a Group VI-B metal, usually molybdenum or tungsten, and a Group VIII metal, usually nickel or cobalt, on a refractory inorganic oxide carrier material, usually alumina or silica-alumina with a minor amount (<10%) of silica.

Catalysis is a mechanism not always understood and in many instances unpredictable from the aspect of activity, selectivity, stability and the like. Minor variations in physical characteristics and/or composition may provide unexpected and substantial differences in efficiency or usefulness in connection with a particular conversion reaction. For example, we have found that hydrodesulfurization catalysts, similar to the general type mentioned above, can result in a surprisingly advantageous hydrodesulfurization process from the standpoint of catalyst life, and initial catalyst expense when a catalyst having the properties in accordance with those specified in the present invention is used as the hydrodesulfurization catalyst.

The primary objective of the present invention is to provide a relatively advantageous process and catalyst for hydrodesulfurization of hydrocarbons, especially heavy hydrocarbons, compared to previously disclosed hydrodesulfurization processes.

The term "heavy hydrocarbon feedstock" is used in the present invention to mean feedstocks for which at least 50 percent of the material boils above 600° F. at atmospheric pressure. Particularly preferred heavy hydrocarbon feedstocks include whole crude, shale oil, tar sand oil, and heavy fractions of the aforementioned oils. We have found that residuum feedstocks, i.e., reduced crude from an atmospheric distillation tower or vacuum residuum from a vacuum distillation tower, and vacuum gas oils, i.e., distilled gas oils from a vacuum distillation tower, are particularly effectively desulfurized to reduce sulfur levels by the process of the present invention. The feed to the process of the present invention may be given a pretreatment as, for example, deasphalting or demetalation of the feedstock.

Numerous disclosures have been made of hydrodesulfurization processes and catalysts for use therein. For example, the following somewhat speculative disclosure is made by S. C. Schuman and H. Shalit in Catalysis Reviews, 4(2), 245–318 (1970):

Speculation on the composition of catalysts employed in commercial residuum desulfurization processes may be of little value, but is nevertheless too tempting to omit here. There is little evidence that precious metal catalysts are being used, since they would not be especially effective in the face of the large amounts of sulfur, nitrogen, and organometallic compounds in the feed, and the tendency of the feed to deposit large amounts of carbon on the catalyst. When the feed contains relatively high amounts of organometallic compounds, such use would seem to be prohibitive, since most of the contaminants are indicated to be deposited on the catalyst.

Use of supported nickel-tungsten sulfide [165], the catalyst used unsupported by the Germans to hydrogenate heavy tars, is more possible but still not likely. Because of the large amounts of tungsten employed, these catalysts must be more expensive than the cobalt and nickel "molybdate" catalysts used for distillate desulfurization. Although nickel-tungsten catalysts may have substantial value in a hydrocracking operation or in an operation where ring saturation is desirable, there is no evidence that the added expense of these catalysts offers compensating benefits in residuum desulfurization, particularly when the residuum is relatively high in organometallic compounds.

Thus, it is reasonable to believe that catalysts used for residuum desulfurization are not greatly different in composition from those used in distillate desulfurization. Conceivably, the iron group sulfides (possibly including iron in this case as well as cobalt or nickel) might be used without molybdenum, but there is no real evidence of this. If cobalt, nickel, or iron "molybdate" catalysts are used for residuum stocks containing a high content of metals, it would seem possible to utilize catalysts containing relatively low amounts of active components, since the catalyst must be replaced often; however, published descriptions of residuum processes provide no evidence that this is so. When hydrodesulfurization is the prime objective, "nickel molybdate" would seem to offer no advantages over "cobalt molybdate."

It is likely that the support for the catalyst used in residuum hydrodesulfurization is nonacidic, both from the standpoint of desirability and the impossibility of maintaining acidic properties in the presence of the large quantities of nitrogen compounds in the residuum feed. However, there is evidence that some catalysts may contain as much as 30% silica with alumina.

Catalysts used for hydrodesulfurization comprising alumina or silica-alumina and Group VI and Group VIII metal compounds are prepared by procedures that generally fall into one of three categories, namely:

(1) those formed by coprecipitating compounds of the active metals and the alumina or other carrier from a solution in order to form a gel of the carrier material having the catalytically active materials dispersed therein;
(2) those formed by impregnation techniques where either or both the Group VI and Group VIII metals are deposited upon the carrier by impregnating the carrier with a solution or solutions of the metal; and
(3) those formed by comulling the active components and the carrier and forming the mixture into catalyst pellets.

The present invention is concerned with a hydrodesulfurization process using a catalyst prepared by a coprecipitation method.

Prior art patents which are relevant to the present invention include the following:

U.S. Pat. No. 3,642,660 discloses preparation of a germanium-containing catalyst for use in catalytic reforming. U.S. Pat. No. 3,642,660 is specifically directed to:

. . . "a method of preparing a catalytic composite comprising a combination of a platinum group component, a germanium component, and a chlorine component with an alumina carrier material. In the first step, finely divided germanium dioxide particles are uniformly distributed throughout an aluminum hydroxyl chloride sol to form a mixture thereof. Thereafter, the resulting mixture is gelled to form substantially spherical hydrogen particles. In the next step, the resulting hydrogen particles are treated and calcined to produce solid particles comprising a combination of a germanium component and a chlorine component with alumina. The resulting solid particles are then contacted with a solution containing a soluble, decomposable compound of a platinum group metal at impregnation conditions. In the final step, the resulting impregnated solid particles are dried and oxidized to produce a catalytic composite having a platinum group component and a germanium component uniformly dispersed therein."

Thus, according to U.S. Pat. No. 3,642,660, the platinum (Group VIII metal) is added to the catalyst by impregnation.

U.S. Pat. No. 3,280,040 discloses a catalyst preparation procedure wherein Group VI and/or Group VIII metals are included in a catalyst by coprecipitating them with an alumina support material. All of the examples of U.S. Pat. No. 3,280,040 show the alumina is obtained from aluminum chloride, specifically aluminum chloride hexahydrate.

U.S. Pat. No. 3,493,517 is directed to formation of hydro-treating catalysts comprising discrete phosphate particles in a coprecipitated matrix comprising alumina and a Group VI and/or Group VIII metal. The examples of U.S. Pat. No. 3,493,517 show aluminum chloride as a source of the alumina.

U.S. Pat. No. 3,428,572 is directed to formation of a platinum-alumina-sulfur catalyst. According to U.S. Pat. No. 3,428,572, aluminum is digested in hydrochloric acid to obtain a solution (hydrosol) with about 1.2 mols aluminum per mol of chlorine. Chloroplatinic acid and a soluble sulfur compound are added to the hydrosol and then the hydrosol is dropped into oil to form a bead catalyst useful for reforming processes.

Other pertinent patents involving the preparation of catalysts by coprecipitation include U.S. Pat. No. 3,577,353; U.S. Pat. No. 3,227,661; and U.S. Pat. No. 2,451,471.

SUMMARY OF THE INVENTION

According to the present invention, a hydrodesulfurization process is provided which comprises contacting a hydrocarbon feedstock in a reaction zone at a temperature between 500° and 900° F., a pressure between 100 and 3,000 p.s.i.g., and in the presence of hydrogen gas, with a catalyst prepared by steps comprising chemically coprecipitating with ammonia Group VI and Group VIII metals and alumina from a solution containing aluminum hydroxy-chloride as the alumina precursor. It is to be understood that the alumina is in the form of an aluminum compound when precipitated, but is referred to simply as alumina for ease of notation.

Among other factors, the present invention is based on my finding that a catalyst prepared by coprecipitating aluminum hydroxy-chloride with Group VI and Group VIII hydrogenation metals results in an unexpectedly highly stable hydrodesulfurization catalyst.

I have found the catalyst to be especially effective for the desulfurization of heavy hydrocarbon feedstocks, particularly feedstocks such as reduced crude oil, vacuum residuum and vacuum gas oils. The term desulfurization is used herein to mean the reduction of sulfur in hydrocarbon feedstocks. For example, by reducing the sulfur content from the range of ½ to 10 weight percent sulfur down to a level between $\frac{1}{100}$ and 1.5 weight percent sulfur. Typically, our process is employed to reduce the sulfur content by at least 50 percent and usually to obtain product sulfur levels in the range of $\frac{1}{10}$ to 1.0 weight percent sulfur. The sulfur reduction is effected by converting organic sulfur compounds to sulfur-free organic compounds and hydrogen sulfide. Hydrogen sulfide is then separated as a gas from the desulfurized hydrocarbon feedstock.

The Group VI metal used in the catalyst of the present invention is preferably molybdenum or tungsten, and the Group VIII metal is preferably cobalt or nickel. The Group VI and Group VIII metals are usually incorporated into the catalyst from a soluble compound such as ammonium molybdate or cobalt chloride. The metal in the final calcined and/or reduced catalyst is present as the oxide or sulfide, or as the metallic element. Thus, use of the term "metal" herein is to be construed as including the metal in compound form as well as in uncombined elemental form.

Particularly preferred metals for the catalyst used in the hydrodesulfurization process of the present invention are molybdenum and cobalt coprecipitated with aluminum hydroxy-chloride. Preferably the molybdenum-cobalt-alumina catalyst also contains dispersed titanium phosphate particles.

Preparation of the molybdenum-cobalt-alumina catalyst is preferably carried out by coprecipitation methods such as described in my U.S. Pat. No. 3,280,040, but the catalyst used in the process of the present invention must be prepared using aluminum hydroxy-chloride.

Preparation of the molybdenum-cobalt-titanium phosphate-alumina catalyst is preferably carried out by coprecipitation methods such as described in my U.S. Pat. No. 3,493,517, but, again, the catalyst used in the hydrodesulfurization process of the present invention must be prepared using aluminum hydroxy-chloride.

According to a preferred embodiment of the present invention a hydrodesulfurization process is provided which comprises contacting a heavy oil in a reaction zone, at a temperature between 600° F. and 850° F., a pressure between 100 and 3,000 p.s.i.g., and in the presence of hydrogen gas, with a catalyst prepared by coprecipitating precursors of molybdenum oxide, cobalt oxide, titanium phosphate, and alumina derived from aluminum hydroxy-chloride, and then drying and calcining the precipitated material.

Preferably, little or no silica is included in the catalyst used in the process of the present invention. I have found that silica addition generally tends to worsen the stability of hydrodesulfurization catalysts, perhaps by conferring undesirable acidity.

The aluminum hydroxy-chloride $[Al(OH)_xCl_y]$ used in the process of the invention can have a wide range of ratios of hydroxyl moieties to chloride moieties. Preferably the range is $Al(OH)_{.5}Cl_{2.5}$ to $Al(OH)_{2.5}Cl_{.5}$.

EXEMPLARY DATA

Table I, below, summarizes a comparison between hydrodesulfurization fouling rate for a process in accordance with the present invention using a catalyst prepared from aluminum hydroxychloride vs. hydrodesulfurization using a catalyst prepared from aluminum chloride.

TABLE I

| Al salt | Starting temp., ° F. | Fouling rate, ° F./hr. |
| --- | --- | --- |
| $Al(OH)_2Cl$ | 732 | 0.12 |
| $AlCl_3$ | 733 | 0.21 |

Nominal weight percent composition for the catalyst used to obtain the desulfurization data of Table I was as follows:

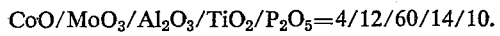
$CoO/MoO_3/Al_2O_3/TiO_2/P_2O_5 = 4/12/60/14/10$.

The aluminum hydroxy-chloride used to prepare the catalyst was formed by the following reaction:

$AlCl_3 + 2Al + 6H_2O \rightarrow 3Al(OH)_2Cl + 3H_2$ (Gas)

The reaction was exothermic and largely self-sustaining at a temperature of 90° C. and Al molarity approximately 1.8. Time to dissolve the aluminum completely was 4–8 hours using 8–20 mesh aluminum granules.

The aluminum hydroxy-chloride solution was combined with titanium tetrachloride and acetic acid. This was then added to a dilute solution of cobalt chloride and phosphoric acid to form a slurry of finely-divided titanium phosphate particulates. Sodium molybdate solution and ammonia solution was added to coprecipitate remaining catalyst components as a gel slurry at pH 6.5. The gel was filtered, dried, extruded, washed free of soluble salts, and dried further at successively higher temperatures to a final calcination at 1150° F.

The catalyst used in the hydrodesulfurization process of the present invention is prepared by a procedure falling in the category of coprecipitation, but it should be understood that not necessarily all of the components of the catalyst are precipitated simultaneously. Thus, as in the preceding example, for those catalysts containing titanium phosphate there can be titanium phosphate precipitation before the other components of the catalyst precipitate or gel.

Process test conditions used to generate the data of Table I include a feedstock of Arabian Light residuum having a sulfur content of 2.8% and a gravity of 17.5° API. Reaction zone conditions for the hydrodesulfurization included a liquid hourly space velocity of 1.2, a pressure of 1,400 p.s.i.g., a temperature range from about 730° F. to 800° F., and a hydrogen rate of 2,000 standard cubic feet per barrel of feed hydrocarbon. Product sulfur content for the desulfurized light residuum was 0.5 weight percent sulfur.

As can be seen from Table I, the fouling rate for the desulfurization catalyst prepared using aluminum hydroxy-chloride was only about one-half the fouling rate for the similar catalyst prepared using aluminum trichloride. This improvement in fouling rate is very important for hydrodesulfurization of hydrocarbons, particularly heavy hydrocarbons, because catalyst cost is a major factor in the overall expense of hydrodesulfurization. In the case of hydrodesulfurization of heavy oils it is difficult to regenerate the catalyst for reuse because metals present in the heavy oil feedstock, such as vanadium and iron, deposit on the catalyst and make regeneration or rejuvenation of a catalyst difficult and sometimes impossible. This is in contrast to processes where the feedstock is not a heavy oil, or in contrast to processes such as catalytic reforming of naphtha hydrocarbons where a catalyst can be regenerated repeatedly to allow a substantial number of sequential runs with the same catalyst.

The fouling rate indicated in Table I is the amount the hydrodesulfurization reaction zone temperature must be increased per unit time in order to maintain sufficient reaction rate to obtain a product with a sulfur content of 0.5 weight percent. Thus, for a fouling rate of .12° F. per hour, the temperature would have to be gradually raised from an initial temperature of 730° F. to 850° F. over a period of 1,000 hours to maintain a product having .5 weight percent sulfur.

What is claimed is:

1. A hydrodesulfurization process which comprises contacting a hydrocarbon feedstock in a reaction zone at a temperature between 500 and 900° F., a pressure between 100 and 3,000 p.s.i.g. and in the presence of hydrogen gas, with a catalyst prepared by steps comprising chemically coprecipitating Group VI and VIII metals and alumina from a solution of aluminum hydroxy-chloride as the alumina precursor, said precipitation being effected by adding ammonia to said solution.

2. A process in accordance with Claim 1 wherein the catalyst is prepared by coprecipitation in an aqueous medium using aluminum hydroxy-chloride and soluble salts of molybdenum and cobalt.

3. A hydrodesulfurization process which comprises contacting a heavy oil in a reaction zone, at a temperature between 600° F. and 850° F., a pressure between 100 and 3,000 p.s.i.g., and in the presence of hydrogen gas, with a catalyst prepared by chemically coprecipitating precursors of molybdenum oxide, cobalt oxide, titanium phosphate, and alumina derived from a solution of aluminum hydroxy-chloride, and then drying and calcining the precipitated material, said precipitation being effected by adding ammonia to said solution.

4. The process as in Claim 1 wherein the ratio of hydroxyl to chloride of said aluminum hydroxy-chloride is in the range of $Al(OH)_{0.5}Cl_{2.5}$ to $Al(OH)_{2.5}Cl_{0.5}$.

5. The process as in Claim 4 wherein said aluminum hydroxy-chloride is $Al(OH)_2Cl$.

References Cited

UNITED STATES PATENTS

| 3,322,666 | 5/1967 | Beuther et al. | 208—216 |
| 3,577,353 | 5/1971 | White | 252—465 |
| 3,493,517 | 2/1970 | Jaffe | 252—465 |
| 3,297,588 | 1/1967 | Kehl et al. | 252—465 |
| 3,644,198 | 2/1972 | Wilhelm | 208—216 |

DELBERT E. GANTZ, Primary Examiner

C. E. SPRESSER, JR., Assistant Examiner

U.S. Cl. X.R.

208—112, 254 H; 252—465